No. 844,808. PATENTED FEB. 19, 1907.
D. KENDALL.
AUTOMATIC RATCHET.
APPLICATION FILED SEPT. 27, 1905.
2 SHEETS—SHEET 1.
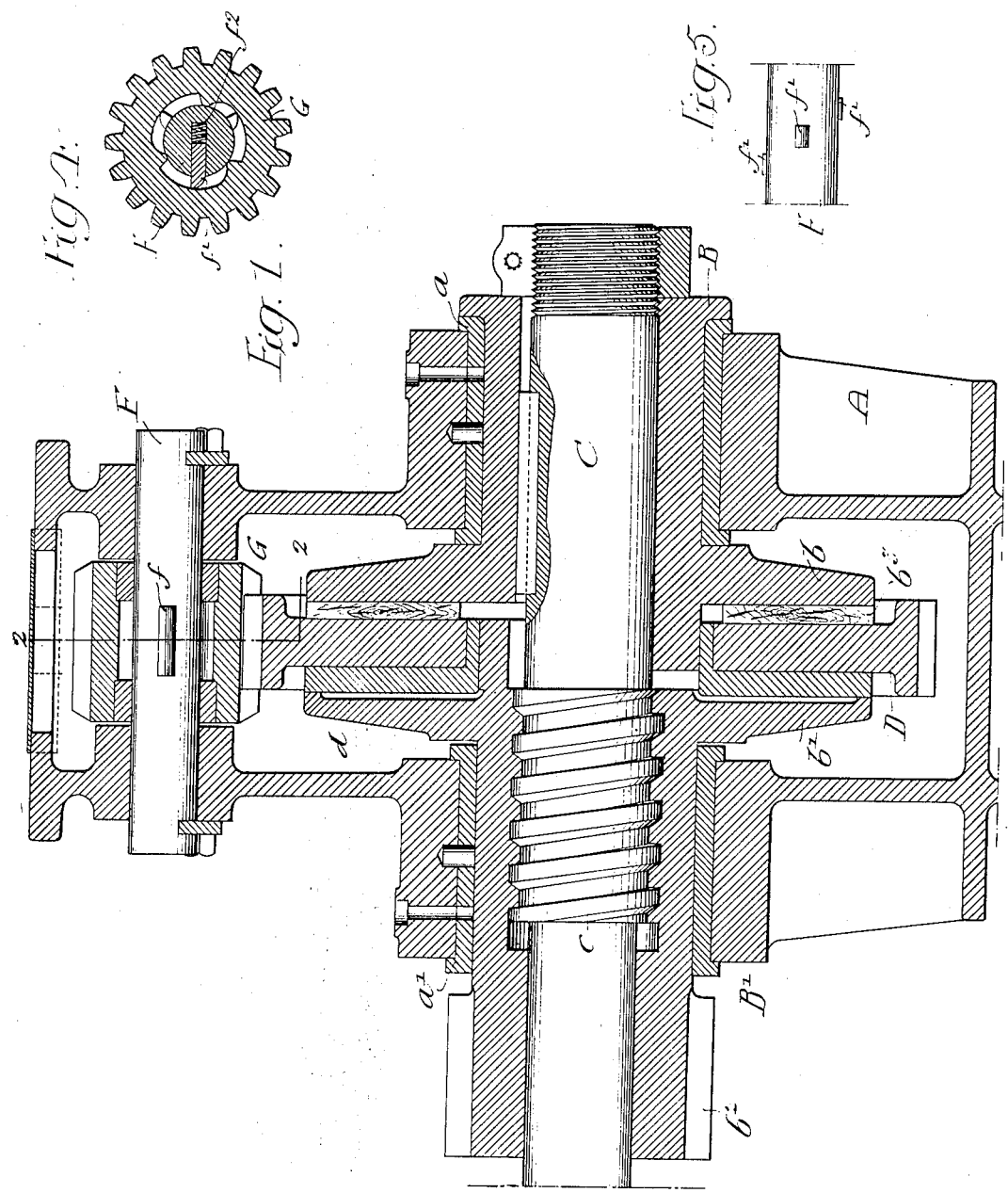

No. 844,808. PATENTED FEB. 19, 1907.
D. KENDALL.
AUTOMATIC RATCHET.
APPLICATION FILED SEPT. 27, 1905.

2 SHEETS—SHEET 2.

Witnesses:
Inventor:
David Kendall.
By his Attorneys,
Howson & Howson

UNITED STATES PATENT OFFICE.

DAVID KENDALL, OF ALLIANCE, OHIO, ASSIGNOR TO THE ALLIANCE MACHINE COMPANY, OF ALLIANCE, OHIO, A CORPORATION OF OHIO.

AUTOMATIC RATCHET.

No. 844,808.      Specification of Letters Patent.      Patented Feb 19, 1907.

Application filed September 27, 1905. Serial No. 280,341.

*To all whom it may concern:*

Be it known that I, DAVID KENDALL, a citizen of the United States, residing in Alliance, Ohio, have invented certain Improvements in Automatic Ratchets, of which the following is a specification.

The object of my invention is to provide a simple, reliable, and noiseless ratchet mechanism, particularly designed for attachment to a brake or to the clutch of a hoisting device, though it will be understood that it may be used with advantage for holding any rotatable device from turning in one direction while leaving it free to turn in the opposite direction.

It is further desired to provide a brake with an automatic ratchet mechanism so constructed that said mechanism shall be contained within the brake inclosure and so arranged as to require a minimum of attention and repairs.

These objects I attain, as hereinafter set forth, reference being had to the accompanying drawings, in which—

Figure 3:
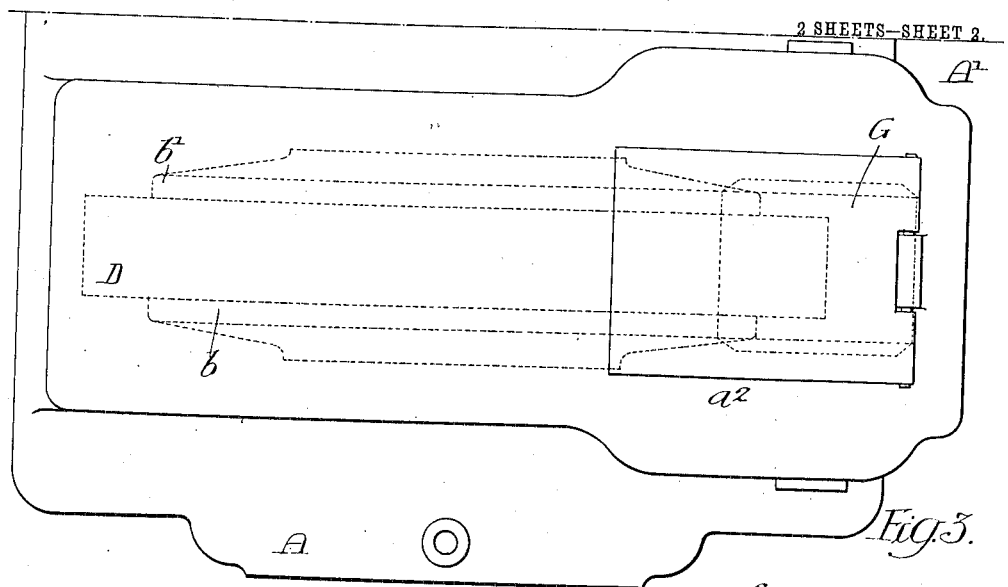
Figure 2:
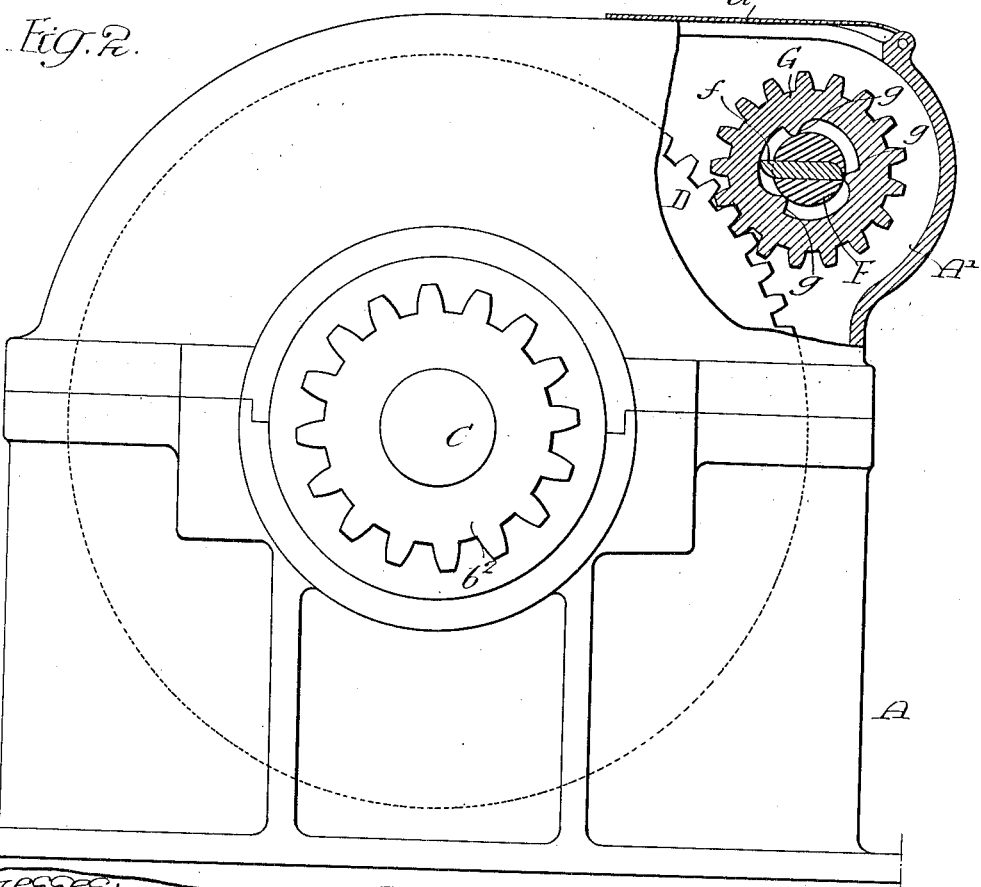

Figure 1 is a vertical section of my improved automatic ratchet, showing it as employed in connection with the brake of a hoisting device. Fig. 2 is a side elevation of the brake illustrated in Fig. 1 and showing in a vertical section the ratchet device, such section being taken on the line 2 2, Fig. 1. Fig. 3 is a plan view of the structure shown in Fig. 1, further illustrating the arrangement of its parts; and Figs. 4 and 5 are respectively a side elevation and a vertical section of a modified form of the ratchet device shown in Figs. 1 to 3.

In the above drawings, A represents the frame for the brake mechanism, and this is constructed as an inclosed casing provided with two bearings having bushings $a$ $a'$, in which are carried two sleeves B and B', having clutch-plates $b$ and $b'$ formed integral with them in the present instance and carried on their adjacent ends. The sleeve B' is also provided with a pinion $b^2$, meshing with the gear of the hoisting mechanism, (not shown,) and it will be understood that one of these sleeves B is keyed to a shaft C, which extends through it, said shaft being provided with threads $c$, engaging similar threads in the sleeve B'.

Between the two clutch-plates $b$ and $b'$ is carried a flanged disk $d$, supported upon what is, in the present instance, overhanging portions of the two sleeves B and B'. The friction-plate $b$ is provided with wooden blocks $b^3$, and between said blocks and the disk $d$ is the web of a gear-wheel D. Under normal operating conditions the plates $b$ and $b'$ are set up so that if the gear-wheel D be held from moving the friction between said disks and its face will be sufficient to prevent lowering of a load mechanically connected to the pinion $b^2$. On the other hand the friction between these parts is such that said pinion may be turned independently of the gear D if in addition to the load external power be applied to lower said load.

In a chamber A', formed at one side of the upper part of the casing A, is carried a non-revoluble shaft or spindle F, on which is rotatably supported a pinion G, having internal cams or ratchet-teeth $g$ and meshing with the teeth of the gear-wheel D. The spindle or shaft F is slotted transversely, and in the slot is placed a sliding pawl $f$, having one face of each end curved and the other face plane. The cams $g$ are so placed within the pinion G that revolution of said pinion in one direction causes the pawl $f$ to slide back and forth in its slot in the shaft F, whereas revolution of the pinion in the opposite direction will almost immediately cause the plane face of one end of said pawl to engage a plane face of one of the cams, and so prevent further revolution of the pinion. The casing A is provided with an opening having a cover $a^2$ to permit access to the pinion G.

Under operating conditions it will be seen that if the shaft C be turned in a direction to hoist a load it causes the sleeve B' to be moved longitudinally, and so clamp the gear D between the plates $b$ and $b'$. Since this turns said gear, the pinion G will be freely turned upon the shaft F and the pawl $f$ will merely slide back and forth in said shaft. If, however, there be any revolution of the shaft C and the clutch-plates $b$ and $b'$ with the gear-wheel D in the opposite direction, such revolution will almost instantly be stopped, since a very slight turning of the pinion G suffices to bring the plane face of one of its cams $g$ into engagement with the plane face of the pawl $f$, and since the above-noted shaft F cannot turn further movement of any of the parts in this direction is prevented unless additional power be applied to the pinion $b^2$ sufficient to cause slipping between the clutch-plates $b$ and $b'$ and the gear-wheel D.

It will be seen that under operating conditions the ratchet device makes no noise and at the same time is absolutely certain as to its action in permitting revolution of the gear-wheel D in but a single direction. It is of such a nature, moreover, that it requires no attention and operates with but little likelihood of getting out of order. Moreover, being within the casing A the device, as a whole, is relatively compact and not likely to be damaged from external sources.

If desired, the key within the pinion G may be made as shown in Figs. 4 and 5, in which case I form any desired number of recesses in the shaft F, in the present instance three, and in each of them I place a pawl $f''$, having its outer end formed like one end of the pawl $f$ with one face plane and the other curved. Each pawl is continually pressed outwardly by a spring $f^2$ and the three pawls are so placed that their lines are one hundred and twenty degrees apart. In any case they act under operating conditions like the pawl $f$ to permit revolution of the pinion G in one direction while preventing it in the opposite direction.

I claim as my invention—

1. The combination with a member to be prevented from rotating in one direction, of a pinion geared to said member, a fixed spindle for said pinion, collars on the spindle serving to support the pinion, a parallel-sided pawl slidably mounted in said spindle and projecting into the space defined by the pinion and said collars, there being teeth within the pinion placed to be engaged by said pawl so as to prevent revolution of said pinion in one direction, substantially as described.

2. In a mechanical brake, the combination of a gear-wheel having friction-surfaces, a disk for each side of the wheel, means for causing said disk to grip or release the gear-wheel, a fixed shaft, and an internally-toothed pinion on said shaft meshing with the gear-wheel and provided with a parallel-sided, slidable key adapted to engage the internal teeth of the pinion, substantially as described.

3. The combination of an inclosed casing, mechanism therein including a gear-wheel, a spindle extending through said casing having holding means on the outside of the casing whereby it is prevented from turning, a hollow, internally-toothed pinion rotatably carried on said spindle and meshing with said gear-wheel, the internal teeth of the pinion having each a curved and a plane face, a parallel-sided pawl reciprocable in a slot in said spindle and having an end or ends formed with a curved and a plane face, said pawl co-acting with the before-mentioned teeth to permit of revolution of the pinion in but a single direction, substantially as described.

In testimony whereof I have signed my name to this specification in the presence of two subscribing witnesses.

DAVID KENDALL.

Witnesses:
  GEO. W. SHEM,
  EDWIN W. DIEHL.